March 31, 1931. H. G. LEFFINGWELL 1,798,981
AUTOMOBILE SIGNAL WINDOW
Filed April 15, 1929 2 Sheets-Sheet 1
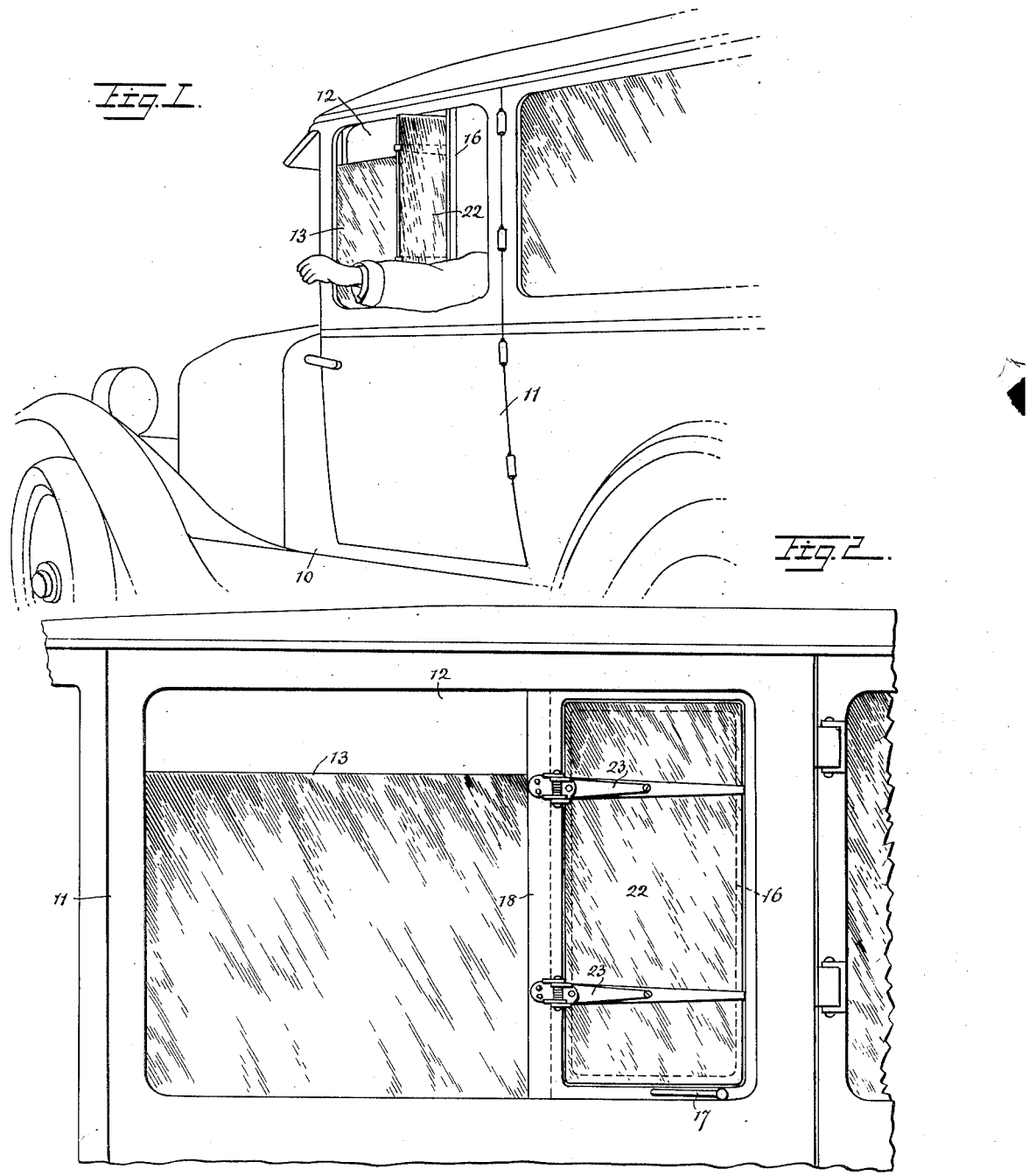
WITNESSES
H. T. Walker
Chris Feinle
INVENTOR
H. G. LEFFINGWELL
BY
ATTORNEYS March 31, 1931. H. G. LEFFINGWELL 1,798,981
AUTOMOBILE SIGNAL WINDOW
Filed April 15, 1929  2 Sheets-Sheet 2
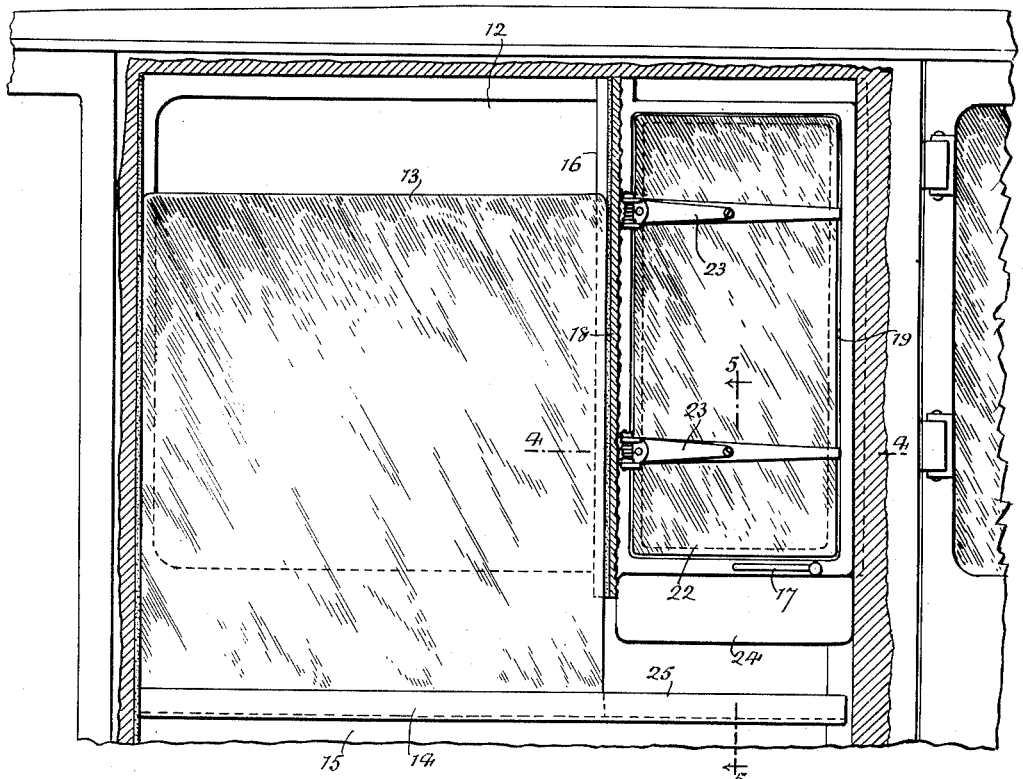
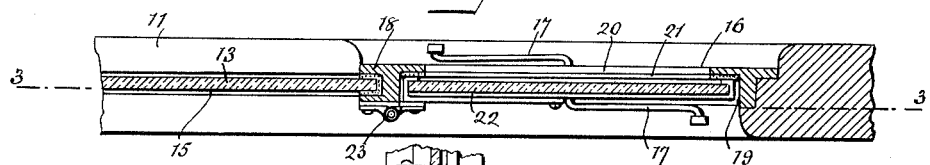
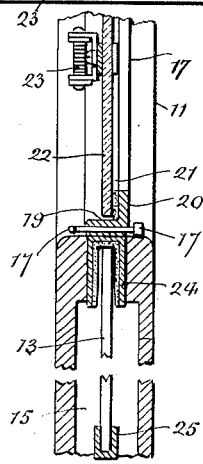
WITNESSES
H. T. Walker
Chris Feinle.
INVENTOR
H. G. LEFFINGWELL
BY
ATTORNEYS Patented Mar. 31, 1931

1,798,981

UNITED STATES PATENT OFFICE

HOWARD G. LEFFINGWELL, OF GRAND JUNCTION, COLORADO

AUTOMOBILE SIGNAL WINDOW

Application filed April 15, 1929. Serial No. 355,386.

This invention relates to an automobile signal window enabling a driver to indicate by hand signals his or her intention to turn to the "right" or "left" or "stop".

The principal object of the invention is the provision of a window of the indicated character which will enable a driver to conveniently perform signaling operations, one which will be self-closing, one which will not interfere with the driver's vision, and one which will embody features of construction lending themselves to the ready installation of the window.

The nature of the invention and its distinguishing features and advantages will appear when the following specification is read in connection with the accompanying drawing, in which—

Figure 1 is a fragmentary perspective view of an automobile equipped with a signal window constructed in accordance with the present invention, and illustrating the left arm of the driver in a signaling position.

Fig. 2 is a fragmentary side view.

Fig. 3 is a sectional view taken on the line 3—3 of Fig. 4.

Fig. 4 is an enlarged sectional view taken on the line 4—4 of Fig. 3.

Fig. 5 is a sectional view taken on the line 5—5 of Fig. 3.

In the drawing, 10 designates the body of an automobile having a door 11 adjacent the driver's seat. The door has an opening 12 which is controlled by a glass panel 13. The lower edge of the panel 13 has a channel or clip member 14 with which mechanism, not shown, cooperates for raising the panel 13 to a position to close a part of the opening 12 and also for the purpose of lowering the panel 13 into the usual recess 15 in the door 11.

In accordance with the present invention a metal frame 16 is arranged in the opening 12. The frame 16 is removably held in place by spring members 17 respectively disposed on opposite sides of the lower rail of the frame. The spring members 17 engage door 11, and force the upper rail of the frame in contact with the upper rail of the door 11. The forward side stile 18 of the frame 16 is in the form of a channel to receive one of the vertical edges of the panel 13 for sliding movement therein. The frame 16 is rabbeted to provide an outer recess 19 and an inner rectangular flange 20. The flange 20 has a strip of felt 21 secured thereto. A glass panel 22 is hingedly connected with the forward side stile of the frame 16 by spring hinges 23. The hinges 23 yieldingly hold the panel 22 in closed position with respect to the frame 16 in the recess 19 thereof, to allow the panel 22 to be moved laterally outward to an open position by a slight pressure from the hand of the driver; the panel 22 being moved automatically to the closed position when the driver's arm is withdrawn. The hinges 23 each include a strap part adapted to clamp the panel 22 so as to obviate drilling of holes through said panel. The flange 20 serves as a stop to limit the movement of the panel 22 to the closed position, and the felt strip 21 presents the necessary cushion to eliminate noise. A stop 24 in the form of a channel is arranged on the bottom of frame 16. The purpose of this stop, which may hold a small piece of polished glass or other material, is to close any space which might occur due to any difference in the height of frame 16 and the height of the opening 12, since window openings vary in size as to height. The stop 24 receives the projecting portion 25 of the member 14 when the panel is in the raised position to steady the panel 13.

The construction and arrangement hereinabove described is one applied to the door of an automobile after it has left the factory. The panel 13 has been cut down to make room for the signal panel 22 together with its frame 16. It is to be understood, however, that a signal window of the construction described may be made an integral part of standard body designs of automobiles to constitute one of the appurtenances thereof.

I claim:

1. The combination with the door of an automobile body, said door having an opening and a main glass panel movable to opened and closed positions with respect to said opening, of a frame removably arranged in said opening, a transparent signal panel hingedly connected with said frame and capable of swinging laterally outward on a vertical axis with respect to said frame, and yieldable means which swings said signal panel to a closed position from its opened position.

2. The combination with the door of an automobile body, said door having an opening and a main glass panel movable to opened and closed positions with respect to said opening, of a frame in said opening, one side edge of the aforesaid panel being in sliding engagement with said frame, a transparent signal panel hingedly connected with said frame and capable of swinging laterally outward with respect to said frame, and yieldable means which swings said signal panel to a closed position from its opened position.

HOWARD G. LEFFINGWELL.